2,912,387
STABILIZED LIQUID METAL DEACTIVATOR CONCENTRATE

Frederick W. Rakowsky, Hammond, Ind., assignor to Standard Oil Company, Chicago, Ill., a corporation of Indiana No Drawing. Application March 14, 1958
Serial No. 721,350

11 Claims. (Cl. 252—403)

The present invention relates to liquid concentrates of certain metal deactivators, which concentrates are resistant to crystallization at low temperatures. More particularly, the invention pertains to a metal deactivator concentrate, the principal ingredient of which is N,N'-disalicylidene-1,2-propylenediamine, which is inhibited against low temperature crystallization.

It is known that the oxidative deterioration of organic substances, for example petroleum products, due to the presence of metal oxidation catalysts, such as copper, is inhibited by the presence of the condensation products of an ortho-hydroxy aromatic aldehyde and an aliphatic polyamine having two primary amino groups. Preferred condensation products, referred to as metal deactivators, are N,N'-disalicylidene-polyamines condensation products obtained by the condensation of two mols of salicylaldehyde with one mol of 1,2-propylenediamine or a mixture of 1,2-propylenediamine and up to 10 mol percent of diethylenetriamine. These condensation products which are commercially available as metal deactivators, are prepared by methods taught in U.S. 2,181,121 issued November 28, 1939, and are referred to hereinafter and in the claims as "an N,N'-disalicylidene-polyamine."

Although such metal deactivators are used in amounts of from about 0.0002% to about 0.01%, based on the organic substance, e.g. a petroleum product such as gasoline, the condensation products are usually marketed for use as an 80% solution in a hydrocarbon solvent, preferably an aromatic hydrocarbon solvent such as benzene, toluene, xylenes and the like. It has been found that such solutions when stored or transported at winter ambient temperatures, crystallization of the condensation product takes place. Such crystallization occurs even in more diluted concentrates, such as 60–65% of the condensation product in the solvent. When such crystallization takes place, the mixture must be heated to dissolve the crystals before the product can be used.

It is, therefore, an object of the present invention to provide a liquid concentrate of N,N'-disalicylidene-polyamines which will not crystallize out of solution at low temperatures. Another object of the invention is to prepare concentrated solutions of an N,N'-disalicylidene-polyamine mixture predominantly N,N'-disalicylidene-1,2-propylenediamine metal deactivator in a normally liquid hydrocarbon solvent from which concentrated solutions the metal deactivator does not crystallize at low temperatures. Other objects and advantages of the invention will become apparent from the following description thereof.

In accordance with the present invention, the foregoing objects, among others, can be attained by using in combination with an N,N'-disalicylidene-polyamine, as above defined, a condensation product of an aliphatic ketone having from 3 carbon atoms to about 10 carbon atoms with an aliphatic polyamine having from 2 carbon atoms to about 10 carbon atoms and having at least one primary amino group. The aliphatic ketone and the aliphatic amine can be used in weight ratios of from about 1:1 to about 1:2 respectively.

The stabilized N,N'-disalicylidene polyamine solution can contain from about 2% to about 40% of the aliphatic ketone-aliphatic polyamine condensation product. The ketone-polyamine stabilizer can be prepared before addition to the N,N'-salicylidenepolyamine, or it can be formed in situ by the addition of the aliphatic ketone and of the aliphatic polyamine to the N,N'-salicylidene-polyamine. The ketone-polyamine condensation readily takes places at temperatures in the range of from about 70° F. to about 200° F.

Illustrative of the aliphatic ketones and of the aliphatic polyamines which can be used in accordance with the present invention are:

Ketones:
    Acetone
    Methyl ethyl ketone
    Diethyl ketone
    Diacetone alcohol
    Methyl amyl ketone
    Methyl isopropyl ketone
    Methyl vinyl ketone Polyamines:
    Ethylene diamine
    Propylene diamine
    1,2-diamino butane
    1,2-diamino pentane
    1,3-diamino butane
    1,4-diamino hexane
    1,3,5-triamino pentane
    Hexamethylene diamine
    Hydroxyethyl ethylene diamine
    Diethylene triamine
    Triethylene tetramine
    Tetraethylene pentamine While condensation products of the aliphatic ketones and aliphatic polyamines, illustrated by the above specific compounds, are effective for the purpose of the herein described invention, it is not to be inferred that they are all equivalent in effectiveness, since under certain conditions some of such condensation products may be more effective than others.

The aliphatic ketone-polyamine stabilizer can be used, if desired, in combination with normally liquid solvents, such as alkanols of from 1 to 4 carbon atoms, or hydrocarbon solvents, particularly a liquid mononuclear aromatic hydrocarbon such as benzene, toluene and the xylenes. When used, such solvent can be employed in amounts of from 5% to about 20%.

The effectiveness of the present invention in inhibiting the crystallization of an N,N'-disalicylidene-polyamine metal deactivator is demonstrated by the data in Table I. These data were obtained by forming solutions of an N,N'-disalicylidene - 1,2 - propylenediamine with various amounts of aliphatic ketone-aliphatic polyamine condensation products, with and without added solvents, and placing the resultant solutions in a 0° F. cold chest. If no crystallization took place in 24 hours, the solutions were seeded with crystals of the N,N'-disalicylidene-1,2-propylenediamine and returned to the cold chest. Solutions in which no crystals formed after seeding were cycled between 40° F. and 0° F. for a week; solutions in which no crystals appeared during the test cycle were considered stabilized against crystallization.

TABLE I

*Effect of various additives on inhibiting low temperature crystallization of N,N'-disalicylidene-1,2-propylenediamine (MD)*

| Test No. | MD, Wt. Percent | Ketone | Wt. Percent | Polyamine[a] | Wt. Percent | Solvent | Wt. Percent | Effectiveness[b] |
|---|---|---|---|---|---|---|---|---|
| 1 | 80 | None | | PDA | 5 | Xylene | 15 | 1 |
| 2 | 95 | Acetone | 5 | None | | None | | 2 |
| 3 | 80 | do | 20 | do | | do | | 2 |
| 4 | 80 | None | | DETA | 20 | do | | 2 |
| 5 | 80 | Acetone | 10 | None | | Xylene | 10 | 2 |
| 6 | 80 | do | 10 | PDA | 10 | None | | 3 |
| 7 | 79 | do | 7 | PDA | 7 | Xylene | 7 | 3 |
| 8 | 80 | do | 10 | DETA | 10 | None | | 3 |
| 9 | 90 | do | 5 | DETA | 5 | do | | 3 |
| 10 | 85 | do | 7.5 | DETA | 7.5 | do | | 3 |
| 11 | 98 | do | 1 | DETA | 1 | do | | 3 |
| 12 | 80 | do | 10 | AEAEOL | 10 | do | | 3 |
| 13 | 66.7 | do | 7.7 | AEAEOL | 14.2 | Xylene | 11.4 | 3 |
| 14 | 66.7 | do | 7.7 | AEAEOL | 14.2 | Methanol | 11.4 | 3 |
| 15 | 66.7 | do | 7.7 | DETA | 14.2 | do | 11.4 | 3 |

[a] PDA=Propylene diamine; DETA=Diethylene triamine; AEAEOL=2-(2-aminoethylamino)ethanol, or (hydroxyethyl ethylene diamine).
[b] Effectiveness rating: 1=Crystallization without seeding; 2=Crystallization after seeding; 3=No crystallization even after seeding.

The data in Table I show the effectiveness of the condensation products of an aliphatic ketone and an aliphatic polyamine in inhibiting low temperature crystallization of the herein defined metal deactivator.

The percentages given herein and in the appended claims are weight percentages unless otherwise stated.

Having described my invention by way of specific examples, it is to be understood that the present invention is not limited thereto but embraces such variations and modifications as come within the spirit and scope of the appended claims.

I claim:

1. A liquid concentrate of an N,N'-salicylidene-polyamine which is resistant to low temperature crystallization, which concentrate consists essentially of from about 60% to about 98% of an N,N'-salicylidene-polyamine, from 0% to about 20% of an organic solvent selected from the group consisting of an alkanol of from 1 to 4 carbon atoms and a normally liquid mononuclear aromatic hydrocarbon, and from about 2% to about 40% of a condensation product of an aliphatic ketone having from 3 to about 10 carbon atoms and an aliphatic polyamine having from 2 to about 10 carbon atoms and at least one primary amino group, said aliphatic ketone and said aliphatic polyamine being used in weight ratios of from about 1:1 to about 1:2 respectively, and said N,N'-salicylidene-polyamine being the condensation product of two mols of salicylaldehyde with one mol of a polyamine selected from the group consisting of 1,2-propylenediamine and mixtures of 1,2-propylenediamine with up to 10 mol percent of diethylene-triamine.

2. A liquid concentrate as described in claim 1 in which the aliphatic polyamine is propylenediamine.

3. A liquid concentrate as described in claim 1 in which the aliphatic polyamine is diethylenetriamine.

4. A liquid concentrate as described in claim 1 in which the aliphatic polyamine is hydroxyethyl ethylene diamine.

5. A liquid concentrate of an N,N'-salicylidene-polyamine which is resistant to low temperature crystallization, which concentrate consists essentially of from about 60% to about 98% of an N,N'-salicylidene-polyamine, from 0% to about 20% of an organic solvent selected from the group consisting of an alkanol of from 1 to 4 carbon atoms and a normally liquid mononuclear aromatic hydrocarbon, and from about 2% to about 40% of a condensation product of acetone and an aliphatic polyamine having from 2 to about 10 carbon atoms and at least one primary amino group, said acetone and said aliphatic polyamine being used in weight ratios of from about 1:1 to about 1:2 respectively, and said N,N'-salicylidene-polyamine being the condensation product of two mols of salicylaldehyde with one mol of a polyamine selected from the group consisting of 1,2-propylenediamine and mixtures of 1,2-propylene-diamine with up to 10 mol percent of diethylene-triamine.

6. A liquid concentrate as described in claim 5 in which the organic solvent is xylene.

7. A liquid concentrate as described in claim 5 in which the organic solvent is methanol.

8. A liquid concentrate as described in claim 5 in which the organic solvent is toluene.

9. A liquid concentrate of an N,N'-salicylidene-1,2-propylenediamine which is resistant to low temperature crystallization, which concentrate consists essentially of from about 80% to about 98% of N,N'-salicylidene-1,2-propylenediamine, and from about 2% to about 20% of a condensation product of acetone and diethylenetriamine, said acetone and said diethylenetriamine being used in weight ratios of 1:1.

10. A liquid concentrate as described in claim 9 in which the organic solvent is xylene.

11. A liquid concentrate of an N,N'-salicylidene-polyamine which is resistant to low temperature crystallization, which concentrate consists essentially of from about 60% to about 98% of an N,N'-salicylidene-polyamine, from 0% to about 20% of an organic solvent selected from the group consisting of an alkanol of from 1 to 4 carbon atoms and a normally liquid mononuclear aromatic hydrocarbon, and from about 2% to about 40% of a condensation product of acetone and propylenediamine, said acetone and said propylenediamine being used in weight ratios of about 1:1, and said N,N'-salicylidene-polyamine being the condensation product of two mols of salicylaldehyde with one mole of a polyamine selected from the group consisting of 1,2-propylenediamine and mixtures of 1,2-propylene-diamine with up to 10 mol percent of diethylene-triamine.

References Cited in the file of this patent

UNITED STATES PATENTS

| 2,181,121 | Downing et al. | Nov. 28, 1939 |
| 2,486,538 | Thompson | Nov. 1, 1949 |
| 2,813,080 | Bartlett | Nov. 12, 1957 |